(12) United States Patent
Shafto et al.

(10) Patent No.: US 10,099,675 B2
(45) Date of Patent: Oct. 16, 2018

(54) SYSTEM AND METHOD FOR IMPROVING FUEL ECONOMY AND REDUCING EMISSIONS WHEN A VEHICLE IS DECELERATING

(71) Applicant: GM Global Technology Operations LLC, Detroit, MI (US)

(72) Inventors: Robert Douglas Shafto, New Hudson, MI (US); Darrell W. Burleigh, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 282 days.

(21) Appl. No.: 14/559,003

(22) Filed: Dec. 3, 2014

(65) Prior Publication Data

US 2016/0115932 A1  Apr. 28, 2016

Related U.S. Application Data

(60) Provisional application No. 62/068,948, filed on Oct. 27, 2014.

(51) Int. Cl.
*B60K 6/00* (2006.01)
*B60W 10/04* (2006.01)
(Continued)

(52) U.S. Cl.
CPC ............ *B60W 10/04* (2013.01); *B60W 10/06* (2013.01); *B60W 20/50* (2013.01); *F01N 11/007* (2013.01);
(Continued)

(58) Field of Classification Search
CPC ...... B60W 10/04; B60W 10/06; B60W 10/02; B60W 10/08; B60W 20/50; B60W 20/40;
(Continued)

(56) References Cited

U.S. PATENT DOCUMENTS 4,434,879 A   3/1984   Lutz et al.
4,492,195 A   1/1985   Takahashi et al.
(Continued)

FOREIGN PATENT DOCUMENTS

CN   1407221 A   4/2003
CN   1875186 A   12/2006
(Continued)

OTHER PUBLICATIONS

Ohata et al., "Benchmark Problem for Automotive Engine Control", SICE Annual Conference, Sep. 2007, pp. 1723-1726.
(Continued)

*Primary Examiner* — Hai Huynh
*Assistant Examiner* — Gonzalo Laguarda (57) ABSTRACT

A system according to the principles of the present disclosure includes a fuel control module, a transmission control module, and a starter control module. The fuel control module selectively stops fuel delivery to cylinders of an engine while the engine is coupled to a transmission of a vehicle when an accelerator pedal is not depressed. The transmission control module selectively decouples the engine from the transmission while fuel delivery to the cylinders is stopped. The fuel control module selectively allows the engine to stop while the vehicle is moving by not resuming fuel delivery to the cylinders when the engine is decoupled from the engine. The starter control module controls a starter to automatically restart the engine when the accelerator pedal is depressed after fuel delivery to the cylinders is stopped and the engine is decoupled from the engine.

22 Claims, 3 Drawing Sheets

(51) Int. Cl.
*B60W 10/06* (2006.01)
*F02D 41/02* (2006.01)
*F01N 11/00* (2006.01)
*F02D 41/12* (2006.01)
*F16H 61/00* (2006.01)
*B60W 20/50* (2016.01)
*F02N 11/08* (2006.01)
*F02D 41/14* (2006.01)

(52) U.S. Cl.
CPC ....... *F02D 41/0215* (2013.01); *F02D 41/123* (2013.01); *F02N 11/0822* (2013.01); *F16H 61/00* (2013.01); *B60W 2540/10* (2013.01); *F02D 41/1495* (2013.01); *F02D 2200/501* (2013.01); *F02D 2200/602* (2013.01); *F02N 11/0829* (2013.01); *F02N 11/0844* (2013.01); *F02N 2200/022* (2013.01); *F02N 2200/0801* (2013.01); *F02N 2200/101* (2013.01); *Y02T 10/48* (2013.01)

(58) Field of Classification Search
CPC .. F01N 11/007; F02D 41/0215; F02D 41/123; F02D 41/042; F02D 41/045; F02N 11/0822; F02N 11/0844; F16H 61/00; B60K 6/48
USPC ............ 123/179.4, 481, 320, 325, 332, 436; 701/110, 112
See application file for complete search history.

(56) References Cited

U.S. PATENT DOCUMENTS

| | | | |
|---|---|---|---|
| 4,495,925 A | 1/1985 | Hasegawa | |
| 4,838,397 A | 6/1989 | Kurihara et al. | |
| 4,958,516 A | 9/1990 | Stiles et al. | |
| 5,667,029 A * | 9/1997 | Urban | B60K 6/442 180/65.23 |
| 5,690,073 A | 11/1997 | Fuwa | |
| 5,704,440 A * | 1/1998 | Urban | B60L 11/123 180/65.23 |
| 5,803,040 A | 9/1998 | Biesinger et al. | |
| 6,155,242 A | 12/2000 | Kotwicki et al. | |
| 6,190,284 B1 * | 2/2001 | Kuroda | B60K 6/485 123/179.4 |
| 6,202,776 B1 | 3/2001 | Masberg et al. | |
| 6,257,207 B1 | 7/2001 | Inui et al. | |
| 6,275,759 B1 | 8/2001 | Nakajima et al. | |
| 6,513,489 B2 | 2/2003 | Osanai | |
| 6,675,088 B2 | 1/2004 | Miki | |
| 6,675,768 B2 | 1/2004 | Kanai | |
| 6,758,190 B2 | 7/2004 | Denz et al. | |
| 6,857,987 B2 | 2/2005 | Aldrich, III et al. | |
| 6,910,457 B2 | 6/2005 | Grieser et al. | |
| 6,931,318 B2 | 8/2005 | Kaita et al. | |
| 6,987,373 B2 | 1/2006 | Kagami et al. | |
| 7,027,911 B2 | 4/2006 | Nishikawa et al. | |
| 7,079,935 B2 | 7/2006 | Lewis et al. | |
| 7,079,941 B2 | 7/2006 | Tetsuno et al. | |
| 7,082,930 B2 | 8/2006 | Liller et al. | |
| 7,130,731 B2 | 10/2006 | Itoh et al. | |
| 7,146,960 B2 | 12/2006 | Phlips et al. | |
| 7,159,571 B2 | 1/2007 | Kassner | |
| 7,177,755 B2 | 2/2007 | Nishikawa et al. | |
| 7,204,226 B2 | 4/2007 | Zillmer et al. | |
| 7,275,509 B2 | 10/2007 | Kassner | |
| 7,331,320 B2 | 2/2008 | Asada | |
| 7,559,304 B2 | 7/2009 | Kataoka et al. | |
| 7,587,270 B2 | 9/2009 | Tabata et al. | |
| 7,614,377 B2 | 11/2009 | Noguchi | |
| 7,664,594 B2 | 2/2010 | Kojima | |
| 7,681,545 B2 | 3/2010 | Taki et al. | |
| 7,809,493 B2 | 10/2010 | Adachi | |
| 7,827,975 B1 | 11/2010 | Gibson et al. | |
| 7,848,875 B2 | 12/2010 | Nakai | |
| 7,931,002 B1 | 4/2011 | Gibson et al. | |
| 8,099,203 B2 | 1/2012 | Miller et al. | |
| 8,140,247 B2 | 3/2012 | Gibson et al. | |
| 8,141,533 B2 | 3/2012 | Demura | |
| 8,157,035 B2 | 4/2012 | Whitney et al. | |
| 8,214,112 B2 | 7/2012 | Rew et al. | |
| 8,230,955 B2 | 7/2012 | Froeschl | |
| 8,240,297 B2 | 8/2012 | Gibson et al. | |
| 8,290,693 B2 | 10/2012 | Shoda et al. | |
| 8,408,176 B2 | 4/2013 | Pursifull et al. | |
| 8,442,747 B2 | 5/2013 | Ma et al. | |
| 8,543,318 B2 | 9/2013 | Ma et al. | |
| 8,635,987 B2 | 1/2014 | Ma et al. | |
| 8,763,582 B2 * | 7/2014 | Lewis | F01L 9/04 123/179.16 |
| 8,812,221 B2 | 8/2014 | Hozumi et al. | |
| 8,840,525 B2 | 9/2014 | Enoki | |
| 8,855,896 B2 | 10/2014 | Ma et al. | |
| 8,872,645 B2 | 10/2014 | Lee et al. | |
| 8,892,339 B2 | 11/2014 | Ma et al. | |
| 8,972,150 B2 | 3/2015 | Ma et al. | |
| 2004/0000281 A1 | 1/2004 | Wakitani et al. | |
| 2004/0084002 A1 | 5/2004 | Mitsutani et al. | |
| 2004/0153236 A1 | 8/2004 | Itoh et al. | |
| 2005/0090365 A1 * | 4/2005 | Tamai | B60K 6/48 477/5 |
| 2005/0109302 A1 | 5/2005 | Tetsuno et al. | |
| 2005/0221952 A1 | 10/2005 | Tetsuno et al. | |
| 2006/0048734 A1 | 3/2006 | Kataoka et al. | |
| 2006/0218923 A1 | 10/2006 | Sopko et al. | |
| 2007/0062476 A1 | 3/2007 | Ota et al. | |
| 2007/0084429 A1 | 4/2007 | Taki et al. | |
| 2007/0163531 A1 | 7/2007 | Lewis et al. | |
| 2007/0261668 A1 | 11/2007 | Kataoka et al. | |
| 2008/0066706 A1 | 3/2008 | Nakamura et al. | |
| 2008/0091328 A1 | 4/2008 | Tabata et al. | |
| 2008/0275624 A1 | 11/2008 | Snyder | |
| 2009/0037085 A1 | 2/2009 | Kojima | |
| 2009/0066337 A1 | 3/2009 | Gibson et al. | |
| 2009/0299586 A1 | 12/2009 | Miller et al. | |
| 2010/0038158 A1 | 2/2010 | Whitney et al. | |
| 2010/0044130 A1 | 2/2010 | Froeschl | |
| 2010/0114461 A1 | 5/2010 | Gibson | |
| 2010/0114462 A1 | 5/2010 | Gibson et al. | |
| 2010/0174460 A1 | 7/2010 | Gibson et al. | |
| 2010/0174473 A1 | 7/2010 | Pursifull et al. | |
| 2010/0211299 A1 | 8/2010 | Lewis et al. | |
| 2011/0136622 A1 | 6/2011 | Enoki | |
| 2011/0146609 A1 | 6/2011 | Enoki | |
| 2011/0166754 A1 | 7/2011 | Kolk et al. | |
| 2011/0295489 A1 | 12/2011 | Ma et al. | |
| 2012/0132163 A1 | 5/2012 | Shoji et al. | |
| 2012/0179353 A1 * | 7/2012 | Anilovich | F02D 41/22 701/101 |
| 2012/0192826 A1 | 8/2012 | Shafto | |
| 2012/0245831 A1 | 9/2012 | Patterson et al. | |
| 2013/0000599 A1 | 1/2013 | Okamoto et al. | |
| 2013/0066540 A1 | 3/2013 | Lewis et al. | |
| 2013/0080039 A1 | 3/2013 | Nakamoto et al. | |
| 2013/0096811 A1 | 4/2013 | Yamauchi et al. | |
| 2013/0138328 A1 | 5/2013 | Shimo et al. | |
| 2013/0304362 A1 | 11/2013 | Santoso et al. | |
| 2014/0046529 A1 * | 2/2014 | Gibson | F02N 11/00 701/22 |
| 2014/0129117 A1 | 5/2014 | Santoso et al. | |

FOREIGN PATENT DOCUMENTS

| | | |
|---|---|---|
| CN | 1912370 A | 2/2007 |
| CN | 101598214 A | 12/2009 |
| CN | 101680414 A | 3/2010 |
| CN | 101900045 A | 12/2010 |
| CN | 102114837 A | 7/2011 |
| CN | 102269073 A | 12/2011 |
| CN | 102649433 A | 8/2012 |
| DE | 3028251 A1 | 3/1982 |
| DE | 3737619 A1 | 5/1988 |

(56) References Cited

FOREIGN PATENT DOCUMENTS

| | | |
|---|---|---|
| DE | 102005049092 A1 | 4/2007 |
| DE | 102007026354 A1 | 12/2008 |
| DE | 102009047382 A1 | 7/2010 |
| DE | 102010027698 A1 | 6/2011 |
| DE | 102013022166 A1 | 9/2014 |
| JP | 02081939 A | 3/1990 |
| JP | 2009-062960 A | 3/2009 |

OTHER PUBLICATIONS

Rokusho et al., "Combined Feedforward and Feedback Control for Start-Up Engine Control", 27th Chinese Control Conference, Jul. 2008, pp. 562-565.
Zhang et al., "Model-Based Cold-Start Speed Control Design for SI Engines", Proceedings of the 17th World Congress of the International Federation of Automatic Control, Jul. 2008, pp. 1042-1047.
Saerens et al., "Minimization of the Fuel Consumption of a Gasoline Engine Using Dynamic Optimization", Applied Energy, vol. 86 Iss. 9, Sep. 2009, pp. 1582-1588.
Rajamani, "Vehicle Dynamics and Control", 2006, Chapter 4, pp. 111-117.
Glossary of Judicial Claim Constructions in the Electronics, Computer and Business Method Arts. Public Patent Foundation. (2010).
First Office Action for Chinese Application No. 201510704618.0 dated Jul. 4, 2017 with English translation; 22 pages.
Second Office Action for Chinese Application No. 201510704618.0 dated Dec. 29, 2017; 12 pages.

\* cited by examiner

SYSTEM AND METHOD FOR IMPROVING FUEL ECONOMY AND REDUCING EMISSIONS WHEN A VEHICLE IS DECELERATING

CROSS-REFERENCE TO RELATED APPLICATIONS

This application claims the benefit of U.S. Provisional Application No. 62/068,948, filed on Oct. 27, 2014. The disclosure of the above application is incorporated herein by reference in its entirety.

FIELD

The present disclosure relates to internal combustion engines, and more specifically, to systems and methods for improving fuel economy and reducing emissions when a vehicle is decelerating.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

SUMMARY

A system according to the principles of the present disclosure includes a fuel control module, a transmission control module, and a starter control module. The fuel control module selectively stops fuel delivery to cylinders of an engine while the engine is coupled to a transmission of a vehicle when an accelerator pedal is not depressed. The transmission control module selectively decouples the engine from the transmission while fuel delivery to the cylinders is stopped. The fuel control module selectively allows the engine to stop while the vehicle is moving by not resuming fuel delivery to the cylinders when the engine is decoupled from the engine. The starter control module controls a starter to automatically restart the engine when the accelerator pedal is depressed after fuel delivery to the cylinders is stopped and the engine is decoupled from the engine.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A powertrain control system may improve fuel economy and reduce emissions by automatically stopping an engine when a vehicle stops after a driver depresses a brake pedal. The powertrain control system may automatically stop the engine by stopping fuel delivery to cylinders of the engine. The powertrain control system may also stop generating spark in the cylinders and/or adjust positions of intake and exhaust valves of the engine to desired positions for an engine start. Stopping the engine in this manner may be referred to as an automatic engine stop since the engine is stopped independent of an ignition system.

After the engine is automatically stopped, the powertrain control system may automatically restart the engine when the driver releases the brake pedal. The powertrain control system may automatically start the engine by controlling a starter to spin the engine and resuming fuel delivery to the cylinders. The powertrain control system may also resume air delivery to the cylinders and spark generation in the cylinders. Starting the engine in this manner may be referred to as an automatic engine start since the engine is started independent of an ignition system.

A powertrain control system may also improve fuel economy and reduce emissions by stopping fuel delivery to cylinders of an engine when the vehicle is decelerating and the driver's foot is off of an accelerator pedal, which may be referred to as deceleration fuel cutoff. When performing deceleration fuel cutoff, powertrain control systems typically rely on the rotating wheels to keep the engine spinning and thereby prevent the engine from stalling. Thus, powertrain control systems typically perform deceleration fuel cutoff when the engine is coupled to a transmission in the vehicle, the transmission is in gear, and the vehicle speed is greater than zero.

As the vehicle continues to decelerate during deceleration fuel cutoff, the powertrain control system may downshift the transmission to prevent the engine from stalling. However, downshifting the transmission while the engine is coupled to the transmission may result in chuggle (vibration in the driveline). Thus, the powertrain control system may control a torque converter to decouple the engine from the transmission before downshifting the transmission. In addition, the powertrain control system may resume fuel delivery to the cylinders to prevent the engine from stalling during the downshift. When the downshift is complete, the powertrain control system may once again stop fuel delivery to the cylinders and allow the engine to stop. The powertrain control system may deliver fuel to the cylinders of the engine for a period of about 10 seconds while the downshift is performed. Since the engine may ultimately be allowed to stop, this period may result in an unnecessary expenditure of fuel.

Some powertrain control systems improve fuel economy and reduce emissions by using an electric motor to keep the engine spinning when the engine is decoupled from the transmission for a downshift rather than resuming fuel delivery to the cylinders. Since fuel is not delivered to the cylinders during the downshift, these powertrain control systems may avoid some unnecessary expenditure of fuel. However, improving fuel economy and reducing emissions in this manner requires an electric motor, which increases the overall cost of the vehicle. Further, some fuel may be consumed to recharge a battery that supplies power to the electric motor. Thus, the reduction in fuel consumption may not be equal to the amount of fuel saved during the downshift.

A system and method according to the present disclosure improves fuel economy and reduces emissions by performing an automatic engine stop when the engine is decoupled from the transmission for a downshift. Thus, instead of resuming fuel delivery to the cylinders to prevent the engine from stalling during the downshift, the system and method allows the engine to stop and thereby avoids any unnecessary expenditure of fuel. Further, since the system and method does not use an electric motor to spin the engine during the downshift, the system and method saves fuel that may otherwise be used to charge a battery that supplies power to the electric motor.

Figure 1:
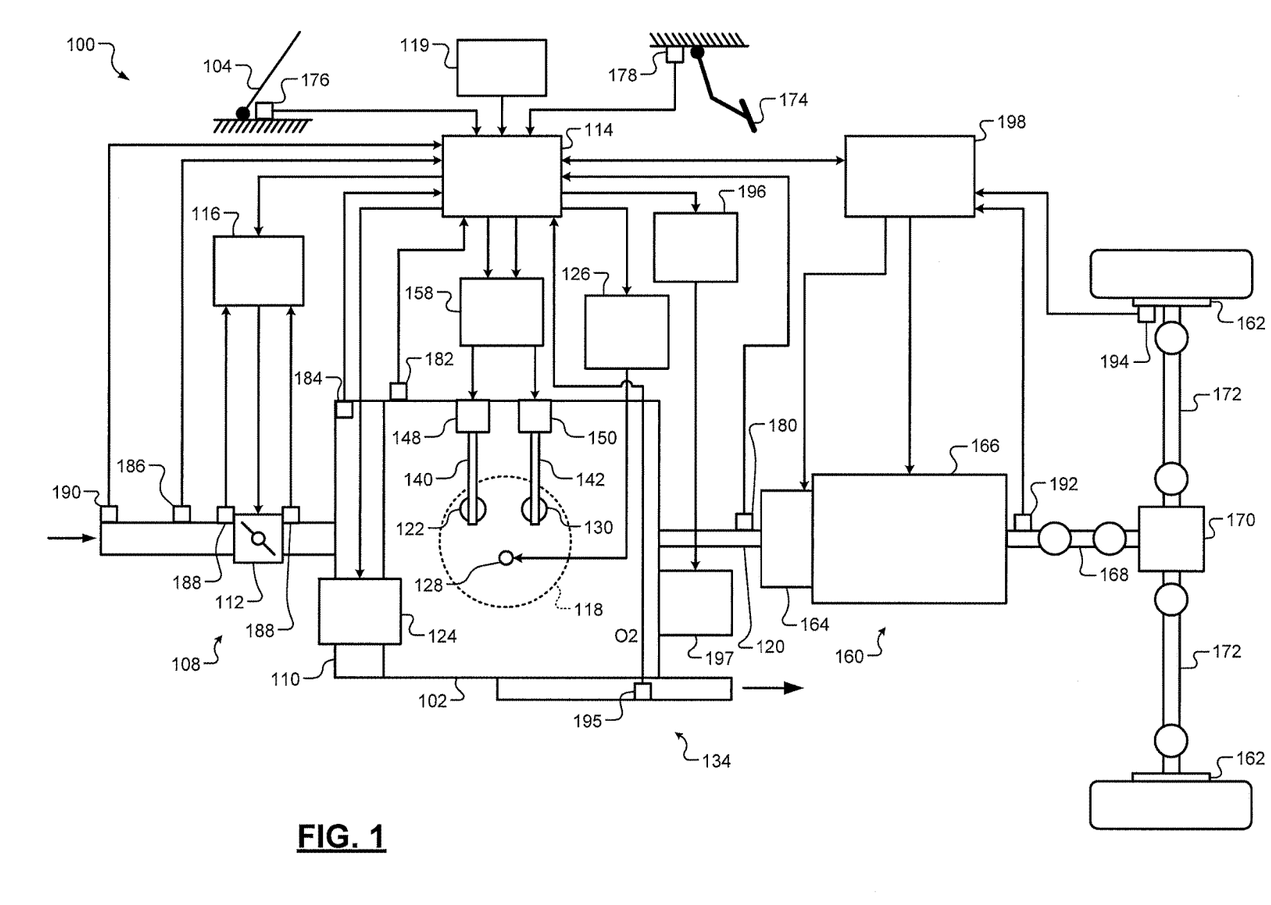
FIG. 1 is a functional block diagram of an example engine system according to the principles of the present disclosure.

Referring now to FIG. 1, an example implementation of a vehicle system 100 includes an engine 102 that combusts an air/fuel mixture to produce drive torque for a vehicle. The amount of drive torque produced by the engine 102 is based on the position of an accelerator pedal 104. The amount of drive torque produced by the engine 102 may also be based on a cruise control system, which may be an adaptive cruise control system that varies vehicle speed to maintain a predetermined following distance.

Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The ECM 114 may start and stop the engine 102 based on an input received from an ignition system 119. The ignition system 119 may include a key or a button. The ECM 114 may start the engine 102 when a driver turns the key from an off position to an on (or run) position or when the driver presses the button. The ECM 114 may stop the engine 102 when a driver turns the key from the on position to the off position or when the driver presses the button while the engine 102 is running.

The engine 102 may operate using a four-stroke cycle. The four strokes, described below, are named the intake stroke, the compression stroke, the combustion stroke, and the exhaust stroke. During each revolution of a crankshaft 120, two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 to generate a spark in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a spark timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, combustion of the air/fuel mixture drives the piston down, thereby driving the crankshaft 120. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake and exhaust cam phasers 148 and 150 based on signals from the ECM 114. When implemented, variable valve lift may also be controlled by the valve actuator module 158.

The valve actuator module 158 may deactivate the cylinder 118 by disabling opening of the intake valve 122 and/or the exhaust valve 130. The valve actuator module 158 may disable opening of the intake valve 122 by decoupling the intake valve 122 from the intake cam phaser 148. Similarly, the valve actuator module 158 may disable opening of the exhaust valve 130 by decoupling the exhaust valve 130 from the exhaust cam phaser 150. In various implementations, the valve actuator module 158 may control the intake valve 122 and/or the exhaust valve 130 using devices other than camshafts, such as electromagnetic or electrohydraulic actuators.

Torque output at the crankshaft 120 is transferred through a drivetrain system 160 to wheels 162. In the example implementation of the vehicle system 100 shown in FIG. 1, the drivetrain system 160 includes a torque converter 164, a transmission 166, a drive shaft 168, a differential 170, and axle shafts 172. In other implementations, the drivetrain system 160 may not include one or more of these components. The torque converter 164, the transmission 166, and the differential 170 amplify engine torque by several gear ratios to provide axle torque at the axle shafts 172. The axle torque rotates the wheels 162 and thereby accelerates the vehicle. The driver may decelerate the vehicle by applying a brake pedal 174.

The vehicle system 100 may measure the position of the accelerator pedal 104 using an accelerator pedal position (APP) sensor 176. The position of the brake pedal 174 may be measured using a brake pedal position (BPP) sensor 178. The position of the crankshaft 120 may be measured using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 188. The ambient temperature of air being drawn into the engine 102 may be measured using an intake air temperature (IAT) sensor 190. The output speed of the transmission 166 may be measured using a transmission output speed (TOS) sensor 192. The speed of the wheels 162 may be measured using a wheel speed sensor (WSS) 194. The concentration of oxygen in exhaust passing through the exhaust system 134 may be measured using an oxygen (O2) sensor 195. The ECM 114 may use signals from the sensors to make control decisions for the vehicle system 100.

The ECM 114 may start the engine 102 by sending instructions to the throttle actuator module 116, the fuel actuator module 124, the spark actuator module 126, and a starter actuator module 196. In response, the throttle actuator module 116 may start air delivery to cylinders of the engine 102, the fuel actuator module 124 may start fuel delivery to the cylinders, and the spark actuator module 126 may start spark generation in the cylinders. In addition, the starter actuator module 196 may control a starter 197 to increase the speed of the engine 102. For example, the starter actuator module 196 may engage a pinion of the starter 197 with a flywheel of the engine 102 and rotate the pinion to rotate the flywheel.

The starter 197 may be a tandem starter and may include one solenoid that engages the pinion of the starter with the flywheel of the engine 102, and another solenoid that rotates the pinion. Thus, the starter actuator module 196 may independently control the engagement and rotation of the pinion, allowing the starter actuator module 196 to engage the pinion with the flywheel when the pinion and the flywheel are rotating at different speeds. In turn, the starter actuator module 196 may control the starter 197 to start the engine 102 when the speed of the engine 102 is greater than zero.

The starter actuator module 196 may engage the pinion with the flywheel when a difference between the speed of the pinion and the speed of the engine 102 is less than a predetermined speed (e.g., 200 revolutions per minute (RPM). Thus, the starter actuator module 196 may engage the pinion with the flywheel before rotating the pinion when the engine speed is less than the predetermined speed. Conversely, the starter actuator module 196 may rotate the pinion before engaging the pinion with the flywheel when the engine speed is greater than or equal to the predetermined speed.

The ECM 114 communicates with a transmission control module (TCM) 198. The TCM 198 sends a control signal to the torque converter 164 to couple the engine 102 to the transmission 166 or to decouple the engine 102 from the transmission 166. The TCM 198 sends a control signal to the transmission 166 to shift gears in the transmission 166. Although some of the sensor signals are shown provided to the TCM 198, the TCM 198 may relay these signals to the ECM 114. Alternatively, these signals may be provided to the ECM 114 directly. In various implementations, various functions of the ECM 114 and the TCM 198 may be integrated into one or more modules. In addition, the ECM 114, the TCM 198, and/or sensors that provide signals to the ECM 114 and/or the TCM 198 may be collectively referred to as a powertrain control system.

Figure 2:
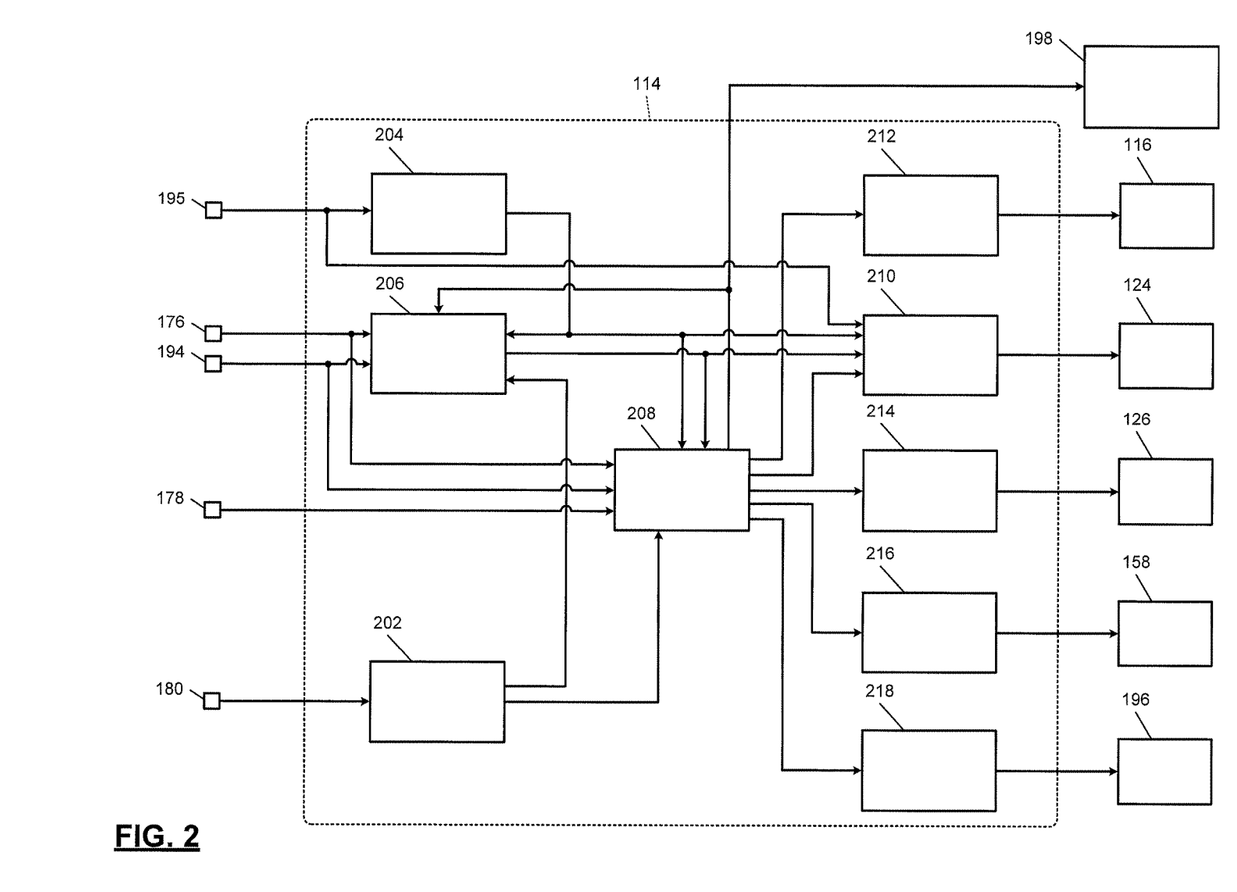
FIG. 2 is a functional block diagram of an example control system according to the principles of the present disclosure.

Referring now to FIG. 2, an example implementation of the ECM 114 includes an engine speed module 202, a diagnostic module 204, a deceleration fuel cutoff (DFCO) module 206, and a start-stop module 208. The engine speed module 202 determines the speed of the engine 102 engine speed based on the crankshaft position from the CKP sensor 180. For example, the engine speed module 202 may calculate the engine speed based on a period that elapses as the crankshaft 120 completes one or more revolutions. The engine speed module 202 outputs the actual engine speed.

The diagnostic module 204 performs diagnostics on components of the vehicle system 100. For example, the diagnostic module 204 may perform a diagnostic on the O2 sensor 195 by ensuring that the output of the O2 sensor 195 is within a predetermined range. The diagnostic module 204 outputs a signal indicating the result of the diagnostic. For example, the signal may indicate that a fault is detected in the O2 sensor 195. In this case, a fuel control module 210 may switch from closed-loop control of fuel delivery to cylinders of the engine 102 based on the output of the O2 sensor 195 to open-loop control of fuel delivery based on, for example, a lookup table.

The DFCO module 206 stops fuel delivery to one or more (e.g., all) cylinders of the engine 102 when the vehicle is decelerating or coasting and the accelerator pedal 104 is not depressed. The act of stopping fuel delivery to the cylinders of the engine 102 may be referred to as deceleration fuel cutoff. The DFCO module 206 determines whether the vehicle is decelerating or coasting based on the wheel speed from the WSS 194. The DFCO module 206 determines whether the accelerator pedal 104 is depressed based on the accelerator pedal position from the APP sensor 176.

The DFCO module 206 may ensure that additional conditions are satisfied before stopping fuel delivery to the cylinders. In one example, the DFCO module 206 may not stop fuel delivery to the cylinders unless the engine 102 is coupled to the transmission 166, the transmission is in gear, and/or the engine speed is greater than an idle speed. The DFCO module 206 may determine whether the engine 102 is coupled to the transmission and the transmission is in gear based on an input from the TCM 198. In another example, the DFCO module 206 may not stop fuel delivery to the cylinders when purge vapor is being delivered to the cylinders, when a catalyst temperature is less than an activation temperature, and/or when a diagnostic is being performed. The DFCO module 206 may determine whether a diagnostic is being performed based on an input from the diagnostic module 204.

The DFCO module 206 stops fuel delivery to the cylinders by sending an instruction to the fuel control module 210. The fuel control module 210 controls fuel delivery to the cylinders by instructing the fuel actuator module 124 to achieve a desired air/fuel ratio. The DFCO module 206 restarts fuel delivery to the cylinders when the conditions required for deceleration fuel cutoff to be performed are no longer satisfied.

As the vehicle decelerates during deceleration fuel cutoff, the TCM 198 downshifts the transmission 166 from a higher gear to a lower gear to prevent the engine 102 from stalling. Certain downshifts, such as a downshift from fourth gear to third gear in a six-speed transmission or a downshift from third gear to second gear on a four-speed transmission, may cause undesired vibration in the drivetrain system 160. Thus, the TCM 198 may control the torque converter 164 to decouple the engine 102 from the transmission 166 before a downshift to prevent such driveline vibration.

The start-stop module 208 automatically stops the engine 102 (i.e., stops the engine 102 independent of the ignition system 119) when the TCM 198 decouples the engine 102 from the transmission 166 during deceleration fuel cutoff and the accelerator pedal 104 is not depressed. The start-stop module 208 may determine when the engine 102 is decoupled from the transmission based on an input from the TCM 198. The start-stop module 208 may ensure that additional conditions are satisfied before stopping the engine 102. For example, the start-stop module 208 may not stop the engine 102 when a diagnostic is being performed. The start-stop module 208 may determine whether a diagnostic is being performed based on an input from the diagnostic module 204.

The start-stop module 208 also automatically stops the engine 102 when the vehicle is stopped and the engine 102 is idling. For example, the start-stop module 208 may automatically stop the engine 102 when the vehicle speed is less than or equal to a predetermined speed (e.g., zero) and the driver depresses the brake pedal 174. The start-stop module 208 determines whether the accelerator pedal 104 is depressed based on the accelerator pedal position from the APP sensor 176. The start-stop module 208 determines whether deceleration fuel cutoff is being performed based on a signal received from the DFCO module 206.

The start-stop module 208 automatically restarts the engine 102 when the driver depresses the accelerator pedal 104. In addition, while the vehicle speed remains greater than zero after fuel delivery to the cylinders is stopped, the start-stop module 208 may automatically restart the engine 102 when the engine speed is greater than a first predetermined speed (e.g., 1,000 RPM) and/or when the vehicle speed is greater than a second predetermined speed (e.g., 20 kilometers per hour). Further, after the vehicle stops (the vehicle speed decreases to zero), the start-stop module 208 may automatically restart the engine 102 when the driver releases the brake pedal 174 and/or when the vehicle speed is greater than zero.

The start-stop module 208 may determine the vehicle speed based on the wheel speed from the WSS 194, for example, by setting the vehicle speed equal to the wheel speed. The start-stop module 208 may determine when the driver depresses or releases the accelerator pedal 104 based on the accelerator pedal position from the APP sensor 176. The start-stop module 208 may determine when the driver depresses or releases the brake pedal 174 based on an input received from the BPP sensor 178.

The start-stop module 208 may automatically stop and restart the engine 102 by sending instructions to a throttle control module 212, the fuel control module 210, a spark control module 214, a valve control module 216, and/or a starter control module 218. The throttle control module 212 controls the throttle valve 112 by instructing the throttle actuator module 116 to achieve a desired throttle area. The spark control module 214 controls the spark plug 128 by instructing the spark actuator module 126 to achieve desired spark timing. The valve control module 216 controls the position of the intake and exhaust valves 122 and 130 by instructing the valve actuator module 158 to achieve desired valve positions. The starter control module 218 controls the starter 197 by instructing the starter actuator module 196 to actuate the solenoids in the starter 197.

The throttle control module 212 may stop the engine 102 by instructing the throttle actuator module 116 to fully close the throttle valve 112. The throttle control module 212 may restart the engine 102 by instructing the throttle actuator module 116 to open the throttle valve 112. The fuel control module 210 may stop the engine 102 by instructing the fuel actuator module 124 to stop delivering fuel to the cylinders of the engine 102. The fuel control module 210 may restart the engine 102 by instructing the fuel actuator module 124 to resume delivering fuel to the cylinders of the engine 102.

The spark control module 214 may stop the engine 102 by instructing the spark actuator module 126 to stop generating spark in the cylinders. The spark control module 214 may instruct the spark actuator module 126 to stop generating spark in the cylinders when the engine speed is less than a predetermined speed (600 RPM). The spark control module 214 may restart the engine 102 by instructing the spark actuator module 126 to resume generating spark in the cylinders. The starter control module 218 may start the engine 102 by instructing the starter actuator module 196 to engage the pinion of the starter 197 with the flywheel of the engine 102 and to rotate the pinion. The starter control module 218 may instruct the starter actuator module 196 to engage the pinion with the flywheel and rotate the pinion until the engine speed is greater than or equal to a predetermined (idle) speed.

As the engine speed decreases during an automatic engine stop, the valve control module 216 may instruct the valve actuator module 158 to actuate the intake and exhaust valves 122 and 130 to desired positions for starting the engine 102. For example, the valve control module 216 may instruct the valve actuator module 158 to actuate the intake and exhaust valves 122 and 130 to the desired positions when the engine speed is less than a predetermined speed (e.g., 800 RPM).

Figure 3:
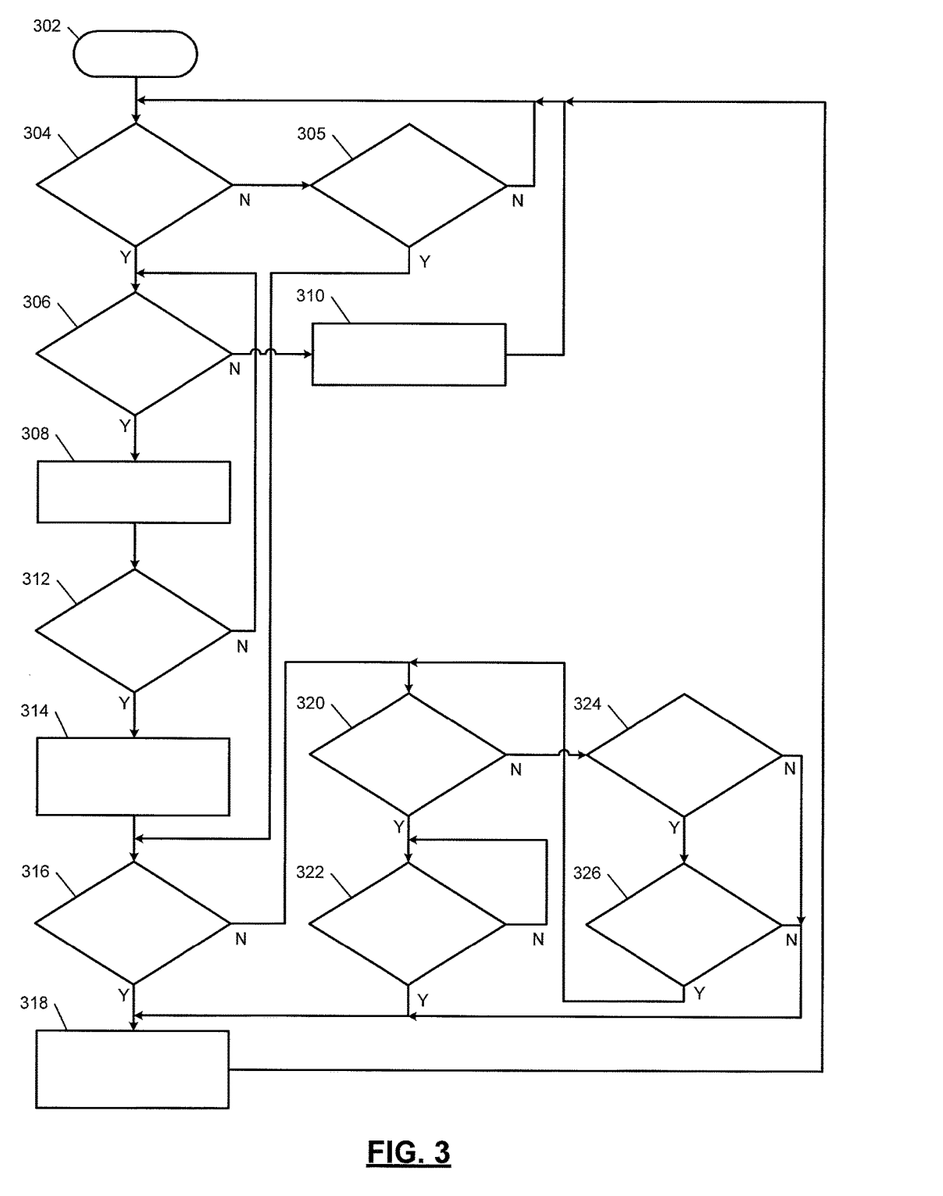
FIG. 3 is a flowchart illustrating an example control method according to the principles of the present disclosure.

Referring now to FIG. 3, a method for improving fuel economy and reducing emissions during vehicle deceleration begins at 302. The method is described in the context of the modules included in the example implementation of the ECM 114 shown in FIG. 2 to further describe the functions performed by those modules. However, the particular modules that perform the steps of the method may be different than the description below and/or the method may be implemented apart from the modules of FIG. 2. For example, the method may be implemented by a single module.

At 304, the DFCO module 206 determines whether the engine 102 is coupled to the transmission 166. If the engine 102 is coupled to the transmission 166, the DFCO module 206 continues at 306. Otherwise, the DFCO module 206 continues at 305. At 305, the DFCO module 206 determines whether fuel delivery to the cylinders of the engine 102 is stopped. If fuel delivery to the cylinders of the engine 102 is stopped, the method continues at 316. Otherwise, the DFCO module 206 determines that the engine 102 is running and continues at 304.

At 306, the DFCO module 206 determines whether the accelerator pedal 104 is not depressed. If the accelerator pedal 104 is not depressed, the DFCO module 206 continues at 308 and stops fuel delivery to the cylinders of the engine 102. Otherwise, the DFCO module 206 continues or resumes fuel delivery to the cylinders at 310.

At 312, the TCM 198 determines whether a downshift is required to avoid an engine stall. The TCM 198 may also determine whether the downshift is likely to cause chuggle (vibration in the drivetrain system 160). The TCM 198 may determine that the downshift is likely to cause chuggle if the downshift is a downshift from fourth gear to third gear in a six-speed transmission or a downshift from third gear to second gear in a four-speed transmission. If a downshift is required to avoid an engine stall and the downshift is likely to cause chuggle, the TCM 198 continues at 314 and decouples the engine 102 from the transmission. Otherwise, the method continues at 306.

At 316, the start-stop module 208 determines whether the accelerator pedal 104 is depressed. If the accelerator pedal 104 is depressed, the start-stop module 208 continues at 318. Otherwise, the start-stop module 208 continues at 320. At 318, the start-stop module 208 controls the starter 197 to start the engine 102 and resumes fuel delivery to the cylinders of the engine 102.

At 320, the start-stop module 208 determines whether the vehicle speed has decreased to zero (i.e., whether the vehicle has stopped). If the vehicle speed has decreased to zero, the start-stop module 208 continues at 322. Otherwise, the method continues at 324.

At 322, the start-stop module 208 determines whether the brake pedal is released. If the brake pedal is released, the start-stop module 208 continues at 318. Otherwise, the start-stop module 208 continues to determine whether the brake pedal is released at 322.

At 324, the start-stop module 208 determines whether the engine speed is less than or equal to the first predetermined speed. If the engine speed is less than or equal to the first predetermined speed, the start-stop module 208 continues at 326. Otherwise, the start-stop module 208 continues at 318.

At 326, the start-stop module 208 determines whether the vehicle speed is less than or equal to the second predetermined speed. If the vehicle speed is less than or equal to the second predetermined speed, the start-stop module 208 continues at 320. Otherwise, the start-stop module 208 continues at 318.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
a fuel control module that, when an accelerator pedal is not depressed, selectively stops fuel delivery to cylinders of an engine while an ignition switch is on and the engine is coupled to a transmission of a vehicle;
a transmission control module that controls a torque converter to selectively decouple the engine from the transmission before controlling the transmission to perform a downshift from one forward gear to another forward gear that is lower than the one forward gear while fuel delivery to the cylinders is stopped, wherein the fuel control module selectively allows the engine to stop while the vehicle is moving by not resuming fuel delivery to the cylinders when the engine is decoupled from the transmission while the transmission performs the downshift; and
a starter control module that controls a starter to automatically restart the engine when the accelerator pedal is depressed after fuel delivery to the cylinders is stopped and the engine is decoupled from the transmission.

2. The system of claim 1 wherein, when the accelerator pedal is depressed after fuel delivery to the cylinders is stopped and the engine is decoupled from the transmission, the starter control module controls the starter to increase the speed of the engine and the fuel control module resumes fuel delivery to the cylinders.

3. The system of claim 1 wherein the fuel control module allows the engine to stop when the engine is decoupled from the transmission independent of whether a brake pedal is depressed.

4. The system of claim 1 wherein, while the speed of the vehicle remains greater than zero after fuel delivery to the cylinders is stopped, the starter control module controls the starter to automatically restart the engine when at least one of:
the speed of the engine is greater than or equal to a first predetermined speed; and
the vehicle speed is greater than or equal to a second predetermined speed, wherein the first and second predetermined speeds are greater than zero.

5. The system of claim 1 wherein, after fuel delivery to the cylinders is stopped and the speed of the vehicle has decreased to zero, the starter control module controls the starter to automatically restart the engine when at least one of:
a brake pedal is not depressed; and
the vehicle speed is greater than zero.

6. The system of claim 1 further comprising a diagnostic module that performs a diagnostic on a component of the vehicle, wherein the fuel control module does not allow the engine to stop while the diagnostic is performed.

7. The system of claim 6 wherein the fuel control module allows the engine to stop when the engine is decoupled from the transmission and the diagnostic is complete.

8. The system of claim 1 further comprising a valve control module that adjusts intake and exhaust valves of the engine to a desired position for an engine start when the speed of the vehicle is less than a predetermined speed after fuel delivery to the cylinders is stopped and the engine is decoupled from the transmission.

9. The system of claim 1 further comprising a spark control module that stops spark generation in the engine when the speed of the vehicle is less than a predetermined speed after fuel delivery to the cylinders is stopped and the engine is decoupled from the transmission.

10. A method comprising:
when an accelerator pedal is not depressed, selectively stopping fuel delivery to cylinders of an engine while an ignition switch is on and the engine is coupled to a transmission of a vehicle;
selectively controlling a torque converter to decouple the engine from the transmission before controlling the transmission to perform a downshift from one forward gear to another forward gear that is lower than the one forward gear while fuel delivery to the cylinders is stopped;
selectively allowing the engine to stop while the vehicle is moving by not resuming fuel delivery to the cylinders when the engine is decoupled from the transmission while the transmission performs the downshift; and
controlling a starter to automatically restart the engine when the accelerator pedal is depressed after fuel delivery to the cylinders is stopped and the engine is decoupled from the transmission.

11. The method of claim 10 further comprising controlling the starter to increase the speed of the engine and resuming fuel delivery to the cylinders when the accelerator pedal is depressed after fuel delivery to the cylinders is stopped and the engine is decoupled from the transmission.

12. The method of claim 10 further comprising allowing the engine to stop when the engine is decoupled from the transmission independent of whether a brake pedal is depressed.

13. The method of claim 10 further comprising, while the speed of the vehicle remains greater than zero after fuel delivery to the cylinders is stopped, controlling the starter to automatically restart the engine when at least one of:
the speed of the engine is greater than or equal to a first predetermined speed; and
the vehicle speed is greater than or equal to a second predetermined speed, wherein the first and second predetermined speeds are greater than zero.

14. The method of claim 10 wherein, after fuel delivery to the cylinders is stopped and the speed of the vehicle has decreased to zero, controlling the starter to automatically restart the engine when at least one of:
a brake pedal is not depressed; and
the vehicle speed is greater than zero.

15. The method of claim 10 further comprising:
performing a diagnostic on a component of the vehicle; and
not allowing the engine to stop while the diagnostic is performed.

16. The method of claim 15 allowing the engine to stop when the engine is decoupled from the transmission and the diagnostic is complete.

17. The method of claim 10 further comprising adjusting intake and exhaust valves of the engine to a desired position for an engine start when the speed of the vehicle is less than a predetermined speed after fuel delivery to the cylinders is stopped and the engine is decoupled from the transmission.

18. The method of claim 10 further comprising stopping spark generation in the engine when the speed of the vehicle is less than a predetermined speed after fuel delivery to the cylinders is stopped and the engine is decoupled from the transmission.

19. The system of claim 1 wherein the system does not use an electric motor to rotate the engine when the transmission performs the downshift.

20. The system of claim 1 wherein the engine is the only device configured to provide direct motive power to wheels of the vehicle.

21. The method of claim 10 further comprising not using an electric motor to rotate the engine when the transmission performs the downshift.

22. The method of claim 10 wherein the engine is the only device configured to provide direct motive power to wheels of the vehicle.

\* \* \* \* \*